Patented Nov. 6, 1945

2,388,318

UNITED STATES PATENT OFFICE 2,388,318

POLYESTERS

Carl J. Frosch, Summit, N. J., assignor to Bell Telephone Laboratories, Incorporated, New York, N. Y., a corporation of New York No Drawing. Application July 11, 1941, Serial No. 401,959

10 Claims. (Cl. 260—75)

This invention relates to novel compositions of matter and more particularly to polyesters containing non-conjugated carbon-to-carbon bonds in their molecules.

Linear polyesters of high molecular weight containing no unsaturated carbon-to-carbon bonds have been prepared by reacting saturated glycols with saturated dicarboxylic acids or by the autoreaction of saturated hydroxy acids. When such an esterification reaction is carried on for a sufficiently prolonged period under conditions such as to remove the water of reaction effectively, linear polyesters may be produced having extremely high molecular weights, which, in the case of polyesters capable of crystallizing at ordinary temperatures, may possess the property of cold drawing. The non-crystalline linear polyesters of high molecular weight are viscous liquids at ordinary temperatures whereas the crystallizable polyesters are hard, tough microcrystalline substances which melt at a definite crystalline melting point to form viscous liquids.

In many instances it is desirable to impart heat or oxygen conversion characteristics to such polyesters, whether they are amorphous or crystalline at ordinary temperatures. This may be done by substituting a corresponding reactant containing a carbon-to-carbon double bond for all or part of one of the fully saturated linear polyester forming reactants described above, as, for instance, by substituting maleic acid for all or a part of the saturated dicarboxylic acid.

However, when a dicarboxylic acid, such as maleic acid, which contains a carbon-to-carbon unsaturated bond conjugated with either another carbon-to-carbon double bond or a carbon-to-oxygen double bond of a carboxyl group, is employed in considerable amounts in a reaction of this type, the highly reactive conjugated double bond causes a polymerization reaction to occur between adjacent molecules at the double bonds simultaneously with the esterification reaction. This polymerization reaction prevents the formation of strictly linear polymers and causes the formation, instead, of polymers made up of cross-linked linear molecular chains. As the reaction mixture is subjected to the prolonged heating necessary for a high degree of esterification the polymerization continues until gelation of the mass ultimately occurs, if a sufficient number of unsaturated bonds are present. Once gelation has taken place, the mobility of the reaction mixture is lost and further esterification becomes so slow that the desired high molecular weights cannot be produced.

The strength and toughness of the solid polymeric substances is dependent upon the length of the linear chains which it is possible to achieve in the polymer. Moreover, certain linear properties, such as the property of cold drawing, can be achieved only when the length of the linear chains reaches a certain minimum value. This property of cold drawing, which imparts strength and toughness to the material, is retained even though the linear polymer is subsequently cross-linked to gelation. The premature gelation of reaction mixtures containing large amounts of maleic acid as a dicarboxylic acid prevents the formation of linear chains of the length desired since the esterification which is responsible for the formation of long molecular chains is interrupted at a relatively early stage of the reaction.

This difficulty with maleic acid may be alleviated somewhat by employing maleic acid mixed with a saturated dicarboxylic acid such as succinic acid in place of reacting maleic acid alone with a glycol. Thus, when a slight excess of ethylene glycol is reacted with a mixture of succinic and maleic acids wherein the maleic acid represents less than 10 mol per cent of the total acid, it is possible to produce partially unsaturated polyesters which have sufficiently long linear molecular chains to possess the property of cold drawing together with the corresponding strength and toughness. However, the effect is largely one of dilution and relatively few unsaturated bonds remain in the polyester for subsequent cross-linking. Moreover, the polymerization reaction during esterification takes place in such a reaction just as when pure maleic acid is used. This results in the using up of some of the unsaturation which would otherwise be available for subsequent cross-linking and also results in a product having a greater viscosity in the molten state than a corresponding strictly linear polyester. This is a disadvantageous characteristic where the polymer is to be used for impregnation and a viscosity as low as possible is to be desired.

The present invention avoids these difficulties by the use of polyester forming reactants containing unsaturated carbon-to-carbon bonds which are not conjugated with other unsaturated carbon-to-carbon bonds or with the carbon-to-oxygen double bonds of a carboxyl group. Since the unsaturated dicarboxylic acids are more readily obtainable than the unsaturated hydroxy acids or the unsaturated glycols, the unsaturated polyesters of the present invention are most easily prepared by reacting a slight excess of a saturated glycol with a dicarboxylic acid containing non-conjugated olefinic unsaturation, such as dihydromuconic acid, alone or together with a saturated dicarboxylic acid.

Due to the lower activity of the non-conjugated olefinic bonds very little, if any, polymerization at the double bonds appears to take place during the prolonged esterification reaction. It is therefore possible to produce polyesters having long essentially linear molecular chains possessing a greater degree of unsaturation than it would be possible to obtain by the use of reactants containing conjugated olefinic bonds. Although the lower activity of the non-conjugated unsaturated bonds eliminates the problem of excessive polymerization during esterification and permits the formation of polymers having as high a degree of esterification as is desired, nevertheless these unsaturated bonds possess sufficient activity to permit effective cross-linking of the resulting polymer.

The most desirable products from the standpoint of hardness and toughness are produced when the polymer is made up of long linear chains corresponding to a degree of esterification in excess of 95 per cent of the theoretical and preferably in excess of 98 per cent of the theoretical. Such degrees of esterification are readily obtainable according to the present invention.

However, the advantages resulting from reduced double bond polymerization during esterification are not limited to polymers involving such high degrees of esterification. Therefore lower molecular weight polyesters containing non-conjugated olefinic unsaturation are intended to be included within the scope of the present invention as well as copolymers containing other ingredients imparting a tendency toward thermosetting. Some of the advantages of the present invention are obtained when a dicarboxylic acid containing non-conjugated unsaturation, such as dihydromuconic acid, is mixed with a dicarboxylic acid, containing conjugated unsaturation, such as maleic acid, and the mixture is esterified with a glycol, such as ethylene glycol or decamethylene glycol to form a polymer of relatively high molecular weight.

The following examples will serve to illustrate the preparation of the polyesters of the present invention.

*Example 1*

1.05 mols of ethylene glycol and 1.00 mol of dihydromuconic acid were heated in a glass vessel at 200° C. for 20 hours while bubbling dry, oxygen-free hydrogen through the reaction mixture. The product when cooled was a very viscous, clear, colorless liquid which had no tendency to crystallize. A film of the material when air dried formed a very tough, clear, insoluble, flexible coating.

*Example 2*

1.05 mols of diethylene glycol and 1.00 mol of dihydromuconic acid were reacted in a glass reaction vessel at 200° for 15 hours in an inert atmosphere of nitrogen. The product was a clear colorless viscous liquid which showed no tendency to crystallize. A film of this material formed a very tough, flexible coating when baked for 10 minutes at 120° C. in air.

*Example 3*

1 mol of decamethylene glycol and 1 mol of dihydromuconic acid were heated at 200° C. for 24 hours while bubbling dry, oxygen-free hydrogen through the reaction mixture. The resulting viscous, colorless liquid crystallized upon cooling to a white, tough mass. Fibers of this material could be cold drawn to form oriented fibers which gave an X-ray fiber diagram. The crystallized mass melted sharply at 46° to 48° C. The addition of 0.10 per cent to 2 per cent by weight of benzoyl peroxide resulted in rapid gelation upon heating to 100° C. The gelled material crystallized to a white, tough mass upon cooling.

*Example 4*

1.05 mols of ethylene glycol, 0.95 mol of succinic acid and 0.05 mol of dihydromuconic acid were reacted in the presence of 0.005 per cent by weight of zinc chloride as a catalyst at 200° C. for 24 hours, while bubbling dry, oxygen-free hydrogen continuously through the mixture. The resulting clear, viscous liquid crystallized slowly, upon cooling, to a white, crystalline solid melting at 95° C. This material formed an excellent thermosetting molding compound when mixed with 0.10 per cent to 5 per cent by weight of benzoyl peroxide. The molded objects formed by curing such a molding powder in molds under heat and pressure were made up of hard, tough microcrystalline material which was an infusible gel at temperatures above the crystalline melting point of the substance.

*Example 5*

3 mols of phthalic acid, 2 mols of glycerin, 1.05 mols of ethylene glycol and 1 mol of dihydromuconic acid were heated in a glass vessel for 5 hours at 200° C. while bubbling dry, oxygen-free hydrogen through the reaction mixture. The resulting viscous, sticky, colorless liquid showed no tendency to crystallize upon cooling. Films of this substance on metal cured to hard, smooth, transparent coatings of good adherence when baked for 10 minutes in air at 150° C. Films of this substance containing small percentages of a peroxide, such as benzoyl peroxide, cured considerably more rapidly when heated in air under the same conditions.

In any esterification reaction involving dihydromuconic acid or other unsaturated dicarboxylic acids containing only non-conjugated unsaturated bonds any cross-linking reaction during esterification must necessarily be very limited. When acids of this type are reacted with a saturated glycol, a linear polyester appears to be produced and apparently esterification may be continued to any desired degree. If the resulting polyester is capable of crystallizing it can be raised to molecular weights considerably above the cold drawing point without difficulty.

Cold drawing appears at molecular weights of 8,000 to 10,000 or higher as determined by the Staudinger viscosity method, corresponding to a degree of esterification in excess of 98 per cent of that theoretically possible for the mixture.

Those compounds incapable of crystallizing at room temperatures, such as polyethylene dihydromuconate, can be raised to correspondingly high molecular weights. Upon curing by heating in air or upon curing in the presence of benzoyl peroxide, the compounds produced have considerably greater strength and toughness than could be obtained by the curing of lower molecular weight linear polyesters. As indicated above, it is impossible to obtain comparable molecular weights with maleic acid or other linear polyester forming reactants containing conjugated unsaturated bonds where the number of unsaturated bonds per unit chain length of linear polyester is the same as in the products of the present invention.

The uncured polymers of the present invention are generally colorless ranging in consistency from viscous liquids to crystalline solids. All of these materials will gradually gel or become cross-linked with time on standing in air, but the rate and amount of cross-linking will depend upon the amount of unsaturation present. The rate of the cross-linking will also increase with temperature. The cross-linking rate may be increased in all these materials by the addition of organic peroxides such as benzoyl peroxide, hydrogen peroxide, acetone peroxide, methyl cellosolve peroxide, dioxane peroxide, ethylether peroxide, and the drying oil peroxides, or of ozonides or other analogous compounds.

In place of the glycols mentioned in the examples given above any suitable glycol such as triethylene glycol, propylene glycol, hexamethylene glycol or decamethylene glycol may be employed. Any other unsaturated dicarboxylic acid containing olefinic unsaturated bonds which are not conjugated with other olefinic bonds or with carbon-to-oxygen double bonds may be employed in place of dihydromuconic acid. Such unsaturated acids may be reacted alone with a suitable saturated glycol or in mixture with a saturated dicarboxylic acid such as succinic acid, glutaric acid, adipic acid, suberic acid, azelaic acid, sebacic acid, decamethylene dicarboxylic acid, duodecamethylene dicarboxylic acid or octadecanedioic acid. Similar results can be obtained by reacting glycols containing non-conjugated olefinic bonds with saturated dicarboxylic acids. Similar polymers can also be obtained by the auto reaction of hydroxy acids containing non-conjugated olefinic bonds.

The polymers produced by the present invention are suitable for many uses, such as for insulation on wire in the cured or uncured state, for cable sheathing materials, for molding materials, for baking finishes on metal and other surfaces, for drying oils, for wrapping and coating films, for adhesives, for rubber substitutes when the material is non-crystalline, for cloth impregnants, for water-proofing coatings and impregnants, or for saturants in the cured or uncured state for textile coverings on wire, particularly wire for outdoor use.

The polymers may be used for these and other purposes alone or in conjunction with peroxides or dryers. Modifying ingredients such as plasticizers, natural or synthetic resins, pigments, dyes or fillers, such as wood flour, cotton flock, powdered metals or glass may be added, if desired.

Although the invention has been described in terms of its specific embodiments, certain modifications and equivalents will be apparent to those skilled in the art and are intended to be included as a part of the invention, which is to be limited only by the reasonable scope of the appended claims.

What is claimed is:

1. Polydecamethylene dihydromuconate of sufficiently high molecular weight to permit it to be cold drawn into fibres showing crystalline orientation along the fibre axis.

2. Polyethylene dihydromuconate having a molecular weight greater than 10,000 as determined by the Staudinger viscosity method.

3. A polyester prepared by the esterification of a mixture consisting of dihydromuconic acid and a glycol made up of two hydroxyl groups separated by a saturated straight chain aliphatic hydrocarbon polymethylene radical, said polyester possessing a molecular weight in excess of 10,000 as determined by the Staudinger viscosity method.

4. A polyester prepared by the esterification of a mixture consisting of a dicarboxylic acid made up of two carboxyl groups separated by a divalent straight chain aliphatic hydrocarbon radical containing a non-conjugated olefinic bond and no other unsaturation and a glycol made up of two hydroxyl groups separated by a saturated straight chain aliphatic hydrocarbon polymethylene radical, said polyester possessing a molecular weight greater than 10,000 as determined by the Staudinger viscosity method.

5. A polyester as described in claim 4, said polyester being microcrystalline and possessing a sufficiently high molecular weight to permit it to be cold drawn into fibres showing crystalline orientation along the fibre axis.

6. A linear polyester derived from the esterification of a glycol and a dicarboxylic acid, said polyester containing sufficient non-conjugated olefinic unsaturation to permit it to be cross-linked to an infusible substance upon heating in the presence of benzoyl peroxide and containing substantially no other non-benzenoid unsaturation, said polyester having an average molecular weight greater than 10,000 as determined by the Staudinger viscosity method.

7. A polyester produced by curing, with an organic peroxide, the polyester of claim 6.

8. A polyester produced by curing, with benzoyl peroxide, the polyester of claim 4.

9. A cross-linked polydecamethylene dihydromuconate produced by curing cold drawn polydecamethylene dihydromuconate with a small proportion of benzoyl peroxide.

10. A cross-linked polyethylene dihydromuconate produced by curing, with a small proportion of benzoyl peroxide, polyethylene dihydromuconate having a molecular weight greater than 10,000 as determined by the Staudinger viscosity method.

CARL J. FROSCH.